(12) United States Patent
Phinney

(10) Patent No.: US 6,375,824 B1
(45) Date of Patent: Apr. 23, 2002

(54) PROCESS FOR PRODUCING POTASSIUM HYDROXIDE AND POTASSIUM SULFATE FROM SODIUM SULFATE

(75) Inventor: Robin Phinney, Calgary (CA)

(73) Assignee: Airborne Industrial Minerals Inc., Calgary (CA)

( * ) Notice: Subject to any disclaimer, the term of this patent is extended or adjusted under 35 U.S.C. 154(b) by 0 days.

(21) Appl. No.: 09/759,253

(22) Filed: Jan. 16, 2001

(51) Int. Cl.$^7$ ............................................. C25B 1/14
(52) U.S. Cl. ..................... 205/496; 205/554; 423/551
(58) Field of Search ............................. 205/496, 554; 423/551

(56) References Cited

U.S. PATENT DOCUMENTS

| | | | |
|---|---|---|---|
| 2,829,095 A | 4/1958 | Oda et al. ................... 204/98 |
| 3,135,673 A | 6/1964 | Tirrell et al. ................. 204/98 |
| 3,206,297 A | 9/1965 | O'Connor ...................... 71/28 |
| 3,222,267 A | 12/1965 | Tirrell et al. ................. 204/98 |
| 3,398,069 A | 8/1968 | Juda .............................. 204/98 |
| 3,429,657 A | 2/1969 | George et al. ................. 23/63 |
| 3,436,175 A | 4/1969 | Atwood ........................ 23/119 |
| 3,502,458 A | 3/1970 | Schenk .......................... 71/64 |
| 3,527,592 A | 9/1970 | McPherson et al. ........... 71/24 |
| 3,528,767 A | 9/1970 | Garrett ........................... 23/89 |
| 3,533,776 A | 10/1970 | Coates ........................... 71/28 |
| 3,539,326 A | 11/1970 | Otsuka et al. ................. 71/28 |
| 3,544,296 A | 12/1970 | Karcher ......................... 71/24 |
| 3,578,339 A | 5/1971 | Boeglin ....................... 23/121 |
| 3,617,243 A | 11/1971 | Neitzel .......................... 71/63 |
| 3,656,891 A | 4/1972 | Chemtob ........................ 23/59 |
| 3,687,639 A | 8/1972 | Barlow et al. ............... 23/300 |
| 3,711,254 A | 1/1973 | McGowan et al. ........... 23/313 |
| 3,728,438 A | 4/1973 | Nasygrov .................... 423/551 |
| 3,843,772 A | 10/1974 | Boeglin ....................... 423/551 |
| 3,853,490 A | 12/1974 | Boeglin et al. .............. 23/313 |
| 3,872,002 A | 3/1975 | Musgrove .................... 210/59 |
| 3,892,552 A | 7/1975 | Gay, Jr. .......................... 71/1 |
| 3,907,654 A | 9/1975 | Radd et al. .................... 204/98 |
| 3,998,935 A | 12/1976 | Adams et al. ................ 423/552 |
| 4,033,842 A | 7/1977 | Loest et al. .................. 204/180 |
| 4,045,543 A | 8/1977 | Sardisco ...................... 423/482 |
| 4,075,068 A | * 2/1978 | Loest et al. .................. 205/496 |
| 4,129,642 A | 12/1978 | Neitzel ........................ 423/199 |
| 4,174,382 A | 11/1979 | Menche ....................... 423/552 |
| 4,215,100 A | 7/1980 | Sokolov et al. ............. 423/552 |
| 4,268,492 A | 5/1981 | Sardisco et al. ............. 423/482 |
| 4,303,619 A | 12/1981 | Kobayashi et al. ......... 422/205 |
| 4,313,753 A | 2/1982 | Segawa et al. ................ 71/61 |
| 4,323,386 A | 4/1982 | Heggabo et al. .............. 71/35 |
| 4,342,737 A | 8/1982 | Iwashita et al. ............. 423/522 |
| 4,385,920 A | 5/1983 | Dancy et al. .................. 71/36 |
| 4,420,468 A | 12/1983 | Yamashita et al. .......... 423/482 |
| 4,440,560 A | 4/1984 | Nakamura et al. ............ 71/24 |
| 4,529,434 A | 7/1985 | Ashmead ....................... 71/34 |
| 4,533,536 A | 8/1985 | Bichara et al. .............. 423/551 |
| 4,561,945 A | 12/1985 | Coker et al. ................. 204/98 |
| 4,562,058 A | 12/1985 | Dancy et al. ................ 423/551 |
| 4,588,573 A | 5/1986 | Worthington et al. ....... 423/552 |
| 4,613,416 A | 9/1986 | Kau et al. ..................... 204/98 |
| 4,668,242 A | 5/1987 | Vitellaro et al. ............ 71/64.05 |
| 4,707,347 A | 11/1987 | Vajna et al. ................. 423/552 |
| 4,710,219 A | 12/1987 | Wahlberg, deceased et al. ............................... 71/11 |

(List continued on next page.)

Primary Examiner—Arun S. Phasge
(74) Attorney, Agent, or Firm—Paul S. Sharpe

(57) ABSTRACT

There is disclosed a process for producing a potassium sulfate electrochemically. The process involves the use of sodium sulfate which is electrolyzed in an electrolytic cell and which results in the production of sodium hydroxide and ammonium sulfate. The process carried out in a two or three-compartment electrolytic cell and the ammonium sulfate is converted by ammoniation and treatment of the ammoniated mixture with potassium chloride to produce potassium sulfate. Potassium sulfate may then also undergo electrochemical treatment to produce potassium hydroxide and ammonium sulfate.

18 Claims, 4 Drawing Sheets

U.S. PATENT DOCUMENTS

| | | |
|---|---|---|
| 4,804,401 A | 2/1989 | Wahlberg, deceased et al. .............................. 71/11 |
| 5,098,532 A * | 3/1992 | Thompson et al. ......... 205/554 |
| 5,152,821 A | 10/1992 | Walter ........................... 71/33 |
| 5,230,779 A | 7/1993 | Martin ........................ 204/98 |
| 5,246,551 A | 9/1993 | Pletcher et al. ............... 204/96 |
| 5,286,354 A | 2/1994 | Bard et al. .................... 204/86 |
| 5,290,404 A | 3/1994 | Toomey ....................... 204/72 |
| 5,298,050 A | 3/1994 | McLaughlin et al. .......... 71/63 |
| 5,366,534 A | 11/1994 | Fischbein et al. ............... 71/63 |
| 5,445,717 A | 8/1995 | Kärki et al. ................... 204/82 |
| 5,529,764 A | 6/1996 | Lampert et al. ............. 423/552 |
| 5,549,876 A | 8/1996 | Zisner et al. ............... 423/199 |
| 5,552,126 A | 9/1996 | Efraim et al. ............... 423/199 |
| 5,571,303 A | 11/1996 | Bexton .......................... 71/34 |
| 5,624,649 A * | 4/1997 | Gal ....................... 423/243.11 |

* cited by examiner

PROCESS FOR PRODUCING POTASSIUM HYDROXIDE AND POTASSIUM SULFATE FROM SODIUM SULFATE

FIELD OF THE INVENTION

This invention relates to manufacturing of sodium hydroxide. More particularly, the invention relates to manufacturing of potassium hydroxide and potassium sulfate by electrolyzing sodium sulfate.

BACKGROUND OF THE INVENTION

Demonstrated worldwide demand for some sodium-based chemicals, particularly for sodium hydroxide (caustic soda), has been on the rise in recent years. This strong demand, which is forecast to continue, keeps this chemical in tight supply position, thereby holding the price at a high level. This trend is not the same with respect to all sodium-based chemicals. In particular, the demand for sodium sulfate and, as a consequence, the price of this chemical is declining at the same time as the demand for caustic soda is rising.

This declining trend in the demand for and prices of sodium sulfate combined with the strong demand for and relatively high prices of other sodium-based chemicals, in particular of caustic soda, created a need for a simple and economical process for producing sodium hydroxide from sodium sulfate as feedstock. This need is even more strongly perceived in countries endowed with vast natural resources of sodium sulfate. This is, for example, the case in Canada, which has large deposits of natural sodium sulfate located in Southern Saskatchewan.

The most direct process for producing sodium hydroxide from sodium sulfate is the electrolytic conversion of an aqueous solution of sodium sulfate into aqueous solutions of sulfuric acid and caustic soda. Numerous implementations of this process are known in the prior art. Most of them make use of electrolytic cells employing diaphragms or ion permeable membranes to separate the product solutions from the feed solution, thus avoiding contamination of the products by the feedstock material.

U.S. Pat. No. 2,829,095, issued Apr. 1, 1958, to Oda et al., discloses a process for the production of acidic and alkaline solutions by electrolysis of a salt solution in a multi-compartment electrolytic cell partitioned by a plurality of anion and cation exchange membranes. The patent also discloses the use of the process for direct production of sodium hydroxide and sulfuric acid from Glauber's salt (sodium sulfate decahydrate).

U.S. Pat. Nos. 3,135,673, issued Jun. 2, 1964, to Tirrell et al., and 3,222,267, issued Dec. 7, 1965, to Tirrell et al. claim a method and apparatus for converting aqueous electrolytic salt solutions to their corresponding acid and base solutions. A three or four compartment electrolytic cell separated by a cation exchange membrane and one or two porous, non-selective diaphragms is used for this purpose. When a solution of sodium sulfate is used as the salt solution, solutions of sodium hydroxide and sulfuric acid or sodium bisulfate are produced.

U.S. Pat. No. 3,398,069, issued Aug. 20, 1968, to Juda, claims a process for the electrolysis of an aqueous saline electrolyte in a multicellular device having cells separated by gas permeable electrodes and further partitioned by microporous fluid-permeable diaphragms or ion-permselective membranes. When applied to a solution of sodium sulfate, the process produces solutions of sodium hydroxide and sulfuric acid.

U.S. Pat. No. 3,907,654, issued Sep. 23, 1975, to Radd et al., discloses an electrolytic cell particularly useful in electrolysis of sodium sulfate to form sulfuric acid and sodium hydroxide. The cell, which does not employ any ion permeable membranes, comprises a housing having a parent solution chamber and two electrode compartments located on the lower side of the housing and separated from each other but in communication with the parent solution chamber and positioned vertically beneath or above. Mounted within the electrode compartments are an anode and a cathode, each of which is porous to permit passage of a product solution therethrough. The product solutions of sodium hydroxide and sulfuric acid separated by gravity forces are withdrawn through the porous electrodes.

U.S. Pat. No. 4,561,945, issued Dec. 31, 1985, to Coker et al., claims a process for producing sulfuric acid and caustic soda by electrolysis of an alkali metal sulfate in a three-compartment membrane cell having a hydrogen depolarized anode. Hydrogen gas in the anode chamber is oxidized to produce hydrogen cations which migrate to the central (buffer) chamber through a membrane and combine with the sulfate anions from the alkali metal sulfate solution to produce sulfuric acid. Alkali metal ions are transported across another membrane to the cathode chamber to produce caustic and gaseous hydrogen. Both membranes used in the cell are cation selective membranes.

A similar process for increasing concentration of sulfuric acid in solutions containing an alkali metal sulfate, sulfuric acid and alkaline earth metal ions is disclosed in U.S. Pat. No. 4,613,416, issued Sep. 23, 1986, to Kau et al. Also in this case the anode compartment and the cathode compartment of a three-compartment cell are each bounded by cation exchange membranes.

In U.S. Pat. No. 5,445,717 issued to Karki et al., issued Aug. 29, 1995, there is disclosed a method for the simultaneous production of alkali metal or ammonium peroxodisulphate salts and alkali metal hydroxide. In the reference, the electrolytic phase of the method is performed in a three-compartment electrolytic cell with the middle space conducting alkali metal sulfate, the anode space ammonium or alkali metal sulfate or a mixture thereof and into the cathode space water diluted alkali metal hydroxide.

This patent proceeds according to a different process to that described herein and does not provide for the preparation of potassium sulfate from a sodium sulfate starting material.

A further variation on electrosynthesis is demonstrated in Toomey, U.S. Pat. No. 5,290,404, issued Mar. 1, 1994. In this reference, an electrochemical cell is employed for producing an alcohol or carboxylic acid from a corresponding metal salt. Metal cations and residues are also recovered during the process. This process does not employ a three-compartment desalination cell, but rather employs a standard two compartment cell divided by cation permeable membrane.

In U.S. Pat. No. 5,246,551, issued Sep. 21, 1993, to Pletcher et al., an electrochemical method for the production of alkali metal hydroxides without co-production of chlorine is disclosed. In this reference, the use of a specific group of salts such as alkali metal carbonates, alkali metal bicarbonates and the like are electrolyzed in a single membrane-two solution cell with hydrogen consuming anodes. One of the advantages of this reference is the lack of the co-production of chlorine, however, the use of these specific salts is not necessary and has been overcome by the instant application.

Martin, in U.S. Pat. No. 5.230,779, issued Jul. 27, 1993, provides an electrochemical process for the production of sodium hydroxide and sulfuric acid from acidified sodium sulfate solutions. The process particularly takes place in a two compartment electrolytic cell and does not provide any teachings with respect to potassium sulfate generation, potassium chloride or ammonium sulfate generation.

Other references generally related to electrolysis and electrosynthesis include U.S. Pat. Nos. 4,033,842 and 5,286,354.

It would be desirable if there were a process where electrosynthesis or other electrochemical methods could be employed to produce useful potassium compounds such as potassium sulfate, potassium chloride as well as fertilizer compositions, namely ammonium sulfate. The present invention employs additional unit operations onto existing processes to result in the preparation of these desirable compounds.

SUMMARY OF THE INVENTION

One object of the present invention is to provide an improved electrochemical process for preparation of potassium sulfate and potassium hydroxide.

A further object of one embodiment of the present invention is to provide a process for producing potassium sulfate in an electrolytic cell, comprising the steps of:

passing a solution of sodium sulfate through a central compartment of a three-compartment electrolytic cell having a cathode compartment and an anode compartment separated from the central compartment by a cation selective ion exchange membrane and an anion selective ion exchange membrane, respectively;

passing a catholyte through the cathode compartment and an anolyte through the anode compartment;

passing a direct electric current between an anode and a cathode located in the anode compartment and the cathode compartment, respectively, thus producing sodium hydroxide in the cathode compartment and sulfuric acid in the anode compartment;

generating ammonium sulfate;

elevating the pH of the ammonium sulfate product;

introducing a potassium chloride; and precipitating potassium sulfate.

The unit operation patented in U.S. Pat. No. 5,098,532, is a particularly useful unit operation and it has been found that by augmenting this unit operation with further process steps, useful products such as potassium sulfate, potassium chloride, ammonium sulfate and potassium hydroxide all can be easily formed without concomitant production of chlorine.

As was proposed in the prior art, metal hydroxides have been previously synthesized electrochemically, but the prior art references failed to provide a process where sodium sulfate could be used as an initial feedstock to prepare the compounds indicated above.

It is known that sodium sulfate can be split into caustic and ammonium sulfate in a three-compartment electrochemical cell by the teachings of U.S. Pat. No. 5,098,532. This technology, as well as other technologies often encounter technical challenges created by the concentrations of acids and basis formed in the electrochemical cell and the back migration of protons across the anion exchange membrane. These problems manifest in negative effect on the current efficiency. The acid concentration in the anolyte also contributes to accelerated anode degradation.

In the instant invention, these problems are alleviated by the introduction of ammonia into the anolyte compartment. This produces caustic with ammonium sulfate the ladder commonly used as fertilizer. The fertilizer (ammonium sulfate) can then be upgraded by chemical transformation in the electrochemical cell to potassium sulfate.

In accordance with a further object of one embodiment of the present invention there is provided a process for producing potassium hydroxide and potassium sulfate, the process comprising the steps of:

(a) providing a first and a second three-compartment electrolytic cell, each cell having a cathode compartment and an anode compartment separated from a central compartment by a cation selective ion exchange membrane and anion selective ion exchange membrane;

(b) passing a solution of sodium sulfate through the central compartment;

(c) passing a catholyte through the cathode compartment and an anolyte through the anode compartment of the first three-compartment electrolytic cell;

(d) passing a direct current between an anode and a cathode located in the anode compartment and the cathode compartment, respectively, to produce sodium hydroxide in the cathode compartment and sulfuric acid in the anode compartment;

(e) generating ammonium sulfate;

(f) elevating the pH of the ammonium sulfate;

(g) introducing potassium chloride into the ammonium sulfate;

(h) forming potassium sulfate;

(i) feeding a solution of the potassium sulfate into the central compartment of a second three-compartment electrolytic cell;

(j) elevating the pH of said potassium sulfate; and (k) forming potassium hydroxide.

To carry out the process according to the invention, any electrolytic flow cell using a two or three-compartment configuration can be used in either continuous or batch mode of operation.

In the process, the anolyte, the catholyte and the feed solution are circulated through the respective compartments of the cell at a flow rate depending on the cell used, typically of from about 0.1 L/min to about 30 L/min. The current density is limited by the efficiency considerations (current efficiency of the process decreases with growing current density) and by the stability of the membranes used. Typical current densities are in a range of from about 1 $mA/cm^2$ to about 500 $mA/cm^2$.

The feed solution of sodium sulfate may have a concentration of from about 0.1M to the solubility limit. The concentration of from about 1M to about 1.1M is preferred. For concentrated feed solutions, it may be necessary to heat the solution generally to about 60° C. prior to circulating it through the cell, to prevent the crystallization of the salt.

The feed solution should be as free as possible of heavy metal contaminants that are usually present in the naturally occurring Glauber's salt. If this salt is used as a starting material, the bulk of heavy metal ions can be precipitated, for example, by addition of sodium carbonate and/or sodium hydroxide to a solution of the salt. The remaining amounts of polyvalent cations, in particular of calcium and magnesium ions, can be removed by treating the resulting solution with an ion exchange resin, e.g. by passing the solution through an ion exchange column packed with a suitable ion exchange material, for example Duolite™ C-467 from Rohm and Haas, or an equivalent material. After such a treatment the heavy metal ion concentration normally will not exceed about 20 ppb.

The catholyte and the anolyte can both be water, but it is preferred that they are solutions of sodium hydroxide and ammonium sulfate, respectively, as this gives improved conductivity. In the case of sodium hydroxide solution, the starting concentration should be in the range of from about 0.01M to about 2.74M. In the case of ammonium sulfate solution the starting concentrations should be in the range of from about 0.01M to about 3.5M. A concentration of about 3M is preferred. The choice of the starting concentrations of the anolyte and the catholyte may be also affected by the mode of operation of the electrolytic cell. For example, for the continuous mode of operation, starting concentrations closer to the upper limits of the above ranges are preferred.

To avoid an excessive accumulation of hydrogen ions in the anolyte, ammonia in either the liquid or the gaseous form is introduced into the anolyte at such a rate as to keep the pH of the solution at a predetermined level. The choice of suitable pH of the anolyte may be affected by several other factors, in particular by the ion exchange membranes and anode materials used. Generally, the pH of the anolyte may be maintained at any level in the range of from about 0.5 to about 12. A pH of from about 0.5 to about 7 is preferred and pH of from about 0.5 to about 3.5 is particularly preferred. It appears that under these acidic conditions there is little or no anode corrosion as well as no or very little formation of nitrogen and ammonium nitrate due to electrooxidation of ammonia.

The materials for electrodes, beside providing good current conduction, must be corrosion resistant under the operating conditions of the cell. Suitable cathodes are low hydrogen over potential cathodes, for example gold, platinum, nickel or stainless steel. Because of the lower cost, nickel and stainless steel are preferred.

The choice of the anode material is mostly restricted by the presence of ammonia in the anolyte solution. Under conditions (pH 9 to 12) cathode made of some materials, such as nickel, graphite and stainless steel may corrode quickly. In this range of pH anodes made of platinum, platinized titanium, magnetite or anodes of low oxygen over potential such as DSA™ type electrodes (iridium or platinum oxides on a titanium substrate) are preferred. Under acidic conditions (pH 0.5 to 2) DSA-$O_2$ anodes are preferred. However, less expensive materials, such as lead dioxide on titanium or Ebonex™ (material comprising $Ti_4O_7$) may be used. Lead dioxide on lead would be even less expensive anode material, but there exists a possibility that this material might liberate lead into the anolyte, thus making ammonium sulfate unacceptable for use as a fertilizer.

The ion-selective membranes used to separate the anode and cathode compartments from the central compartment are essentially insoluble, synthetic, polymeric organic ion-exchange resins in sheet form. Those selective to cations usually have sulfonate and/or carboxylate groups bound to the polymers; those selective to anions usually have amino functionality bound to the polymer. These ion exchange membranes are commercially available under various trade names, for example Nafion™ or Flemion™ (cation exchange membranes) or Neosepta™ (anion exchange membranes). Cation selective membranes made of stable perfluorinated cation exchange resins are preferred.

Even though, in principle, any cation or anion exchange membrane may be used in the process according to the invention, their choice may be in practice limited to those showing sufficiently good stability under operating conditions of the electrolytic cell. For example, the choice of the anion selective membrane maybe limited by both the concentration of sulfate ion and/or ammonia in the anolyte and the presence of hydroxyl ions in the feed solution, due to the back migration of hydroxyl ions from the catholyte. Of the membranes showing good stability, membranes having high ionic selectivity and low electrical resistance are preferred. A person skilled in the art will be able to choose suitable membranes without difficulty.

An example of the anion exchange membrane preferred for carrying out the process of the invention is Neosepta™ AMH membrane, which shows good stability at the anolyte pH in a range of 1–12. Examples of preferred cation exchange membranes are perfluorinated membranes such as Nafion™ and Flemion™ membranes, which show good stability for NaOH concentration up to 50%.

Having thus generally described the invention, reference will now be made to the accompanying drawings.

BRIEF DESCRIPTION OF THE DRAWINGS

Similar numerals in the figures denote similar elements.

DETAILED DESCRIPTION OF THE PREFERRED EMBODIMENTS

Figure 1:
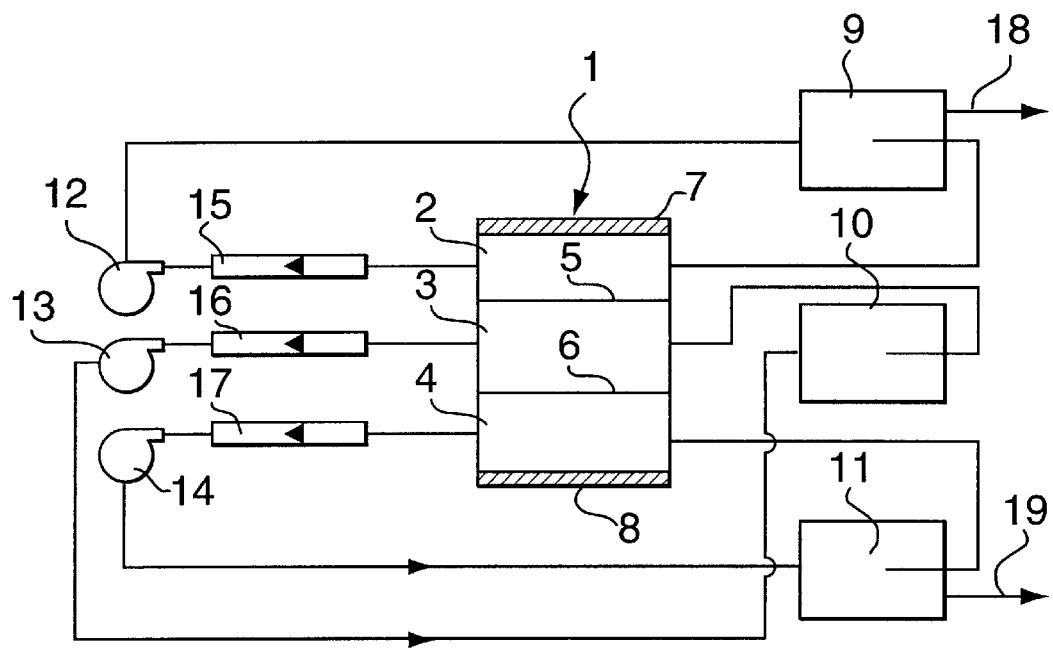
FIG. 1 is a schematic illustration of an embodiment of the set-up of a prior art three-compartment electrolytic cell suitable for use in the process.

Turning now to the Figures, FIG. 1 illustrates a three-compartment electrolytic cell 1 is divided into a cathode compartment 2, a central (feed) compartment 3 and an anode compartment 4 by a cation exchange membrane 5 and an anion exchange membrane 6. A cathode 7 and an anode 8 are situated in the cathode compartment 2 and the anode compartment 4, respectively.

Figure 2:
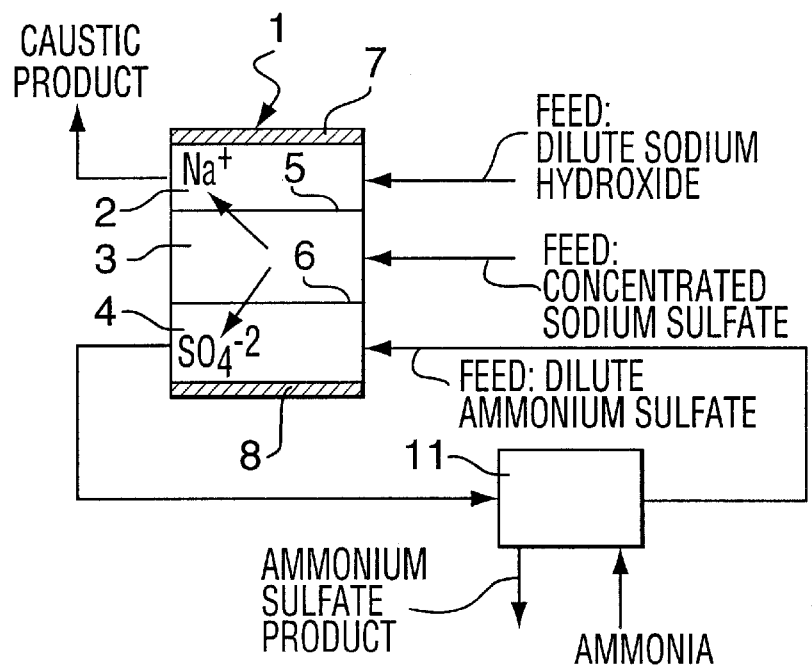
FIG. 2 schematically illustrates an embodiment of the configuration of a three-compartment electrolytic cell for use in the process according to the prior art.

To operate the cell, storage reservoirs 9, 10 and 11 are charged with a catholyte solution, a feed solution and an anolyte solution, respectively. These solutions are circulated through respective compartments of the cell by pumps 12, 13 and 14 at a flow rate measured by flow meters 15, 16 and 17. As a direct current is passed from a source (not shown in the drawings) between the cathode 7 and the anode 8, sodium ions from the feed solution are transported through the cation exchange membrane 5 into the catholyte, whereas sulfate ions are transported through the anion exchange membrane into the anolyte, as shown in FIG. 2. At the same time hydroxide ions and protons are produced in the cathode compartment 2 and the anode compartment 4, respectively, due to the following electrode reactions:

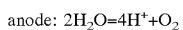

anode: $2H_2O = 4H^+ + O_2$

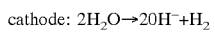

cathode: $2H_2O \rightarrow 2OH^- + H_2$

Hydrogen and oxygen produced in these reactions are vented through outlets 18 and 19, respectively.

The combined result of the above processes is a build-up of sodium hydroxide in the catholyte and sulfuric acid in the anolyte. The build-up of sulfuric acid in the anolyte can be prevented by introducing ammonia into the anolyte, as shown schematically in FIG. 2.

EXAMPLE 1

Glass Cell Electrolysis

Glass cell electrolyses were conducted in H-type cells to check the stability of various anode materials to ammonia solution. The anolyte was 1M ammonium sulfate maintained at pH 9–12 by periodic additions of concentrated $NH_4OH$. A Nafion™ 417 cation exchange membrane was used to separate the anolyte from the catholyte, which was 1M NaOH with a graphite rod as the cathode. A constant current of 1A (200 mA/cm$^2$) was supplied by an ESC Model 420 power supply in conjunction with a Model 410 potentiostat in the galvanostatic mode. Anodes were 5 cm$^2$ flags. Nickel, graphite, 316 stainless steel, magnetite ($Fe_3O_4$), platinized titanium, and DSA-$O_2$ materials were tested. $PbO_2$/Ti and Ebonex™ ($Ti_xO_4$) anodes were also tested at a lower anolyte pH of 1–2. The anodes and anolyte were observed for changes in appearance and in some cases anode weight loss was measured. Electrolyses were performed for 4–24 hours depending on the extent of anode corrosion.

Table 1 shows the results of corrosion tests carried out in glass cells. The first three anode materials tested (nickel, graphite, and 316 stainless steel) quickly corroded in ammonium sulfate+ammonium hydroxide as evidenced by anolyte color changes within 4 hours of electrolysis. The next three materials tested (magnetite, platinized titanium, and DSA-$O_2$) showed no visible evidence of corrosion after 24 hours of electrolysis. Slight weight losses were seen at platinized titanium and magnetite, but not at DSA-$O_2$, indicating that it was the best anode for use in ammonia solutions.

TABLE 1

Stability of Anode Materials to Ammonia Solutions

| Anode Material | Solution | Weight Loss. mg/1000 coul | Corrosion |
| --- | --- | --- | --- |
| Nickel | Lavendar | — | Moderate |
| Graphite | Brown | — | Severe |
| 316 SS | Yellow | — | Severe |
| Magnetite | No Change | 11.7 | Slight |
| Pt/Ti | No Change | 3.3 | Slight |
| DSA-$O_2$ | No Change | 0 | None |
| $PbO_2$/Ti | No Change | — | None |
| Ebonex ™ | No Change | — | Slight |

In acid ammonium sulfate, $PbO_2$/Ti showed no signs of corrosion, while Ebonex™ was slightly pitted. Thus lead dioxide on titanium may be an alternative anode material to DSA-$O_2$ under acidic conditions. However, in the manufacture of such electrodes the titanium is first platinized to avoid peeling of the $PbO_2$ layer, and consequently such electrodes are as expensive as DSA-$O_2$. Lead dioxide on lead would be a less expensive material but may corrode lead into the anolyte making it unacceptable for use as a fertilizer.

EXAMPLE 2

Purification of Glauber's Salt

Raw Glauber's salt was dissolved in hot water to give a solution with a concentration greater than 2M. Suspended impurities were flocculated with an anionic flocculating agent (Percol™ 156, Allied Colloids) and the resulting suspension filtered. The calcium and magnesium contents of the solution at this stage were 442 ppm and 224 ppm, respectively. Sodium carbonate was then added to the resulting solution and the pH was raised to 12 with sodium hydroxide to precipitate out the calcium and magnesium ions. The resulting fine precipitate was flocculated and removed by filtration. This gave a solution that contained 61.6 ppm Ca and less than 0.1 ppm Mg. The solution was then passed through an ion exchange column (Ionac SR-5, Sybron Chemicals) to remove any last traces of polyvalent cations from the solution. Analysis of this solution showed that the heavy metal ion concentrations had been reduced to below the limits of detection, that is below 0.5 ppm Ca and 0.1 ppm Mg. The purified solution was then diluted with water to the required concentration of 2M before being used for flow cell experiments.

EXAMPLE 3

Electrolytic Production of Sodium Hydroxide and Ammonium Sulfate

Flow cell electrolyses of Glauber's salt purified described in Example 2 above were performed in a MP Cell™ (ElectroCell AB, Sweden) using a three-compartment configuration as shown in FIG. 1. Initially, ammonia was introduced to the anolyte from a dropping funnel containing 100% liquid $NH_3$ to maintain an excess of ammonia in solution giving a pH of 9–11. Later experiments (#176-91 to 200-14) utilized gaseous $NH_3$ addition from an ammonia cylinder through a glass sparger tube into the anolyte. The compartments were charged with the following solutions for flow cell experiments:

| | |
| --- | --- |
| Catholyte: | 1L 1M (or 2.5M) NaOH |
| Feed: | 2L 1.75M $Na_2SO_4$ |
| Anolyte: | 1L 1M $(NH_4)_2SO_4$ |

The solutions were circulated through the respective compartments of the cell by March™ MX-MT3 pumps at a flow rate of 0.4 gal/min. A Sorenson™ DCR 60-45B power supply provided a constant current of 20 amps (200 mA/cm$^2$) to the cell and the charge was followed by using a coulometer (ESC Model 640) in the circuit. Anolyte pH was measured by a Corning™ combination probe mounted in line and connected to a Cole-Parmer™ 5997-20 pH meter. Membranes used were Neosepta™ ACM or AMH anion exchange membranes (Tokuyama Soda Co.), Nafion™ 324, 901, or 902 cation exchange membranes (DuPont), or Flemion™ FCA cation exchange membrane. The cathode was 316 stainless steel or nickel, and the anode was either nickel, platinized titanium, shiny platinum, or DSA-$O_2$. Anolyte and catholyte samples (10 ml) were periodically taken and analyzed for ammonium sulfate (gravimetrically by evaporating and weighing) and sodium hydroxide (by titration vs. standardized Hcl). Feed samples were also taken to determine caustic content by titration. The volumes of each compartment were measured at the end of the run to allow the calculation of the number of moles of ammonium sulfate and sodium hydroxide formed. Cell voltage and temperature were measured throughout the run and reported when steady state values had been reached towards the end of the run.

At the end of the runs, anolyte samples were analyzed by HPLC for nitrate ($NO_3$) content from $NH_3$ oxidation. A Waters™ 600 HPLC equipped with a micro-Bondapak™ C-18 column and UV detector (214 nm) was employed for the analysis. The mobile phase was 0.05M $KH_2PO_4$ with 0.025M PIC-A reagent (Waters™), running at a flow rate of 2.5 ml/min. By comparing the sample nitrate peak area to that of a known standard, the anolyte nitrate concentration could be determined.

In flow cell runs where gaseous $NH_3$ addition was employed, the anolyte chamber was sealed so as to be gas tight and the off gases were scrubbed through a sealed trap containing dilute sulfuric acid to remove $NH_3$, and then sampled and analyzed for nitrogen. The concern was that nitrogen could be produced from the oxidation of ammonia, resulting in an excess amount of $NH_3$ required to form ammonium sulfate. Oxygen and nitrogen were separated and quantified on a molecular sieve 5A column mounted in a Perkin-Elmer™ 8500 gas chromatograph equipped with a thermal conductivity detector. Helium was used as the carrier gas at a flow rate of 60 ml/minute and the injector and detector temperatures were set at 120° C. while the oven temperature was 70° C.

Table 2 summarizes the results of initial flow cell runs. The experiments were run to about 40% of complete theoretical conversion (300,000 coulombs) of sodium sulfate to ammonium sulfate and sodium hydroxide. Current efficiencies and concentrations are reported at the end of the runs. Because of overall volume losses of 50 to 100 ml seen in all flow cell runs, the current efficiencies reported show some variance.

The first experiment (#176-59) utilized a nickel anode which corroded into solution giving a purple color to the anolyte. When dimethyl glyoxime was added to anolyte samples, a red precipitate indicative of the presence of nickel was observed. The Neosepta™ ACM membrane was deeply discoloured in areas where it contacted the anolyte and feed solutions which contained ammonia.

The next experiment (#176-63) used a platinized titanium anode. This run was terminated when a rapidly rising cell voltage was observed after the passage of 380,000 coulombs. When the cell was inspected a number of holes were found in the ACM membrane indicating that it was not stable to alkaline solutions. The Pt/Ti anode had a thin coating of brown solids on it, indicating that it had corroded to a small extent.

A shiny platinum anode was used in the next experiment (#176-75) along with Neosepta™ AMH and Nafion™ 901 membranes. The AMH allowed a high current efficiency (99.4%) for $(NH_4)_2SO_4$ formation and showed no evidence of deterioration. The 901 membrane allows very high current efficiencies for caustic formation because it is a bilayer membrane which resists hydroxide back migration from the catholyte. However, it was not known if the membrane would be stable in the presence of high sulfate concentrations.

TABLE 2

STABILITY OF ANODE MATERIALS FOR ELECTRODIALYSIS OF SODIUM SULFATE IN MP FLOW CELL

| | Experiment # | | | |
|---|---|---|---|---|
| | 176-59(a) | 176-63(a) | 176-75(b) | 176-79(b) |
| Coul. Passed × 1000 | 333 | 384 | 283 | 428 |
| Electrodes, Anode/Cathode | Ni/316SS | Pt-Ti/316SS | Pr/Ni | DSA-02/Ni |
| Membranes, Anion/Cation | ACM/324 | ACM/324 | AMH/901 | AMH/901 |

TABLE 2-continued

STABILITY OF ANODE MATERIALS FOR ELECTRODIALYSIS OF SODIUM SULFATE IN MP FLOW CELL

| | Experiment # | | | |
|---|---|---|---|---|
| | 176-59(a) | 176-63(a) | 176-75(b) | 176-79(b) |
| Concentration, g/l | | | | |
| Amm. Sulfate | 249.3 | 260.7 | 250.4 | 300.9 |
| NaOH | 129.0 | 140.3 | 165.3 | 192.0 |
| % Current Efficiency | | | | |
| Amm. Sulfate | 100.8 | 107.4 | 99.4 | 98.5 |
| NaOH | 93.5 | 90.9 | 87.9 | 86.1 |
| Cell Voltage | 9.5 | 14 | 9.5 | |
| Temperature, °C. | 48 | 44 | 43 | 45 |
| Anolyte Wt. % Amm. Nitrate | 2.8 | 4.4 | 3.5 | 3.6 |
| Feed Conc. NaOH₁ g/l | — | — | 5.6 | 8.8 |
| Δ Volume, ml/1000 C | | | | |
| Anolyte | +1.34 | +1.49 | +0.92 | +0.91 |
| Catholyte | +0.78 | +0.80 | +0.71 | +0.69 |
| Feed | -1.64 | -2.66 | -1.88 | -1.80 |
| Δ Volume, overall ml | +168 | -179 | -68 | -85 |
| Anolyte pH | 10-12 | 8-10 | 8-10 | 8-10 |
| Anode Corrosion | Severe | Slight | Slight | None |
| Membrane Stability | ACM discolored | ACM failed | OK | OK |

(a) Starting Conditions: Amm. Sulfate 132.14 g/l, NaOH 40 g/l, Sodium Sulfate 249 g/l, 200 mA/sq. cm.
(b) Starting Conditions: Amm. Sulfate 132.14 g/l, NaOH 100 g/l, Sodium Sulfate 249 g/l, 200 mA/sq. cm.

Actual current efficiency for caustic formation (87.9%) is lower than expected, possibly due to caustic mist being entrained in the hydrogen off gas from the catholyte. A film of brown solids on the Pt anode indicated slight corrosion.

Glass cell tests indicated that $DSA-O_2$ was the most stable anode material. When used in flow cell run #176-79, no corrosion of the $DSA-O_2$ anode was seen. Again, high current efficiency for ammonium sulfate formation and relatively low current efficiency for sodium hydroxide formation were seen. At this point $DSA-O_2$/Ni and AMH were selected as the best electrode pair and anion exchange membrane for the process. Further flow cell tests focused on the stability of these materials as well as the optimal cation exchange membrane material.

Table 3 gives the results of flow cell tests designed to check the stability of the $DSA-O_2$ anode, AMH membrane, and various cation exchange membranes in repeated experiments. Previous experiment #176-79 had shown no corrosion of these materials. However, when this experiment was repeated (#176-84), a very thin film of brown solids was seen on the anode indicating slight corrosion, and the 901 membrane blistered, delaminating the two layers of this membrane. Good current efficiencies for product formation were observed. It was thought that reducing the free ammonia concentration in the anolyte would alleviate the corrosion of the $DSA-O_2$ anode, and thus further experiments were conducted at lower anolyte pH (less $NH_3$ added).

The next two experiments (#176-91 & 95) were performed at a neutral anolyte pH. Also, a higher current density (250 mA/cm²) was employed in these experiments to more rigorously test the membranes. Under these conditions, slight anode corrosion was still observed and the cation exchange membrane failed, allowing caustic to leak into the feed compartment in the second experiment, thus lowering current efficiency for caustic formation. No damage to the AMH membrane was observed.

The 901 membrane was tried one more time in experiment #200-1 under less taxing conditions. Even with a lower initial caustic concentration and a lower current density, the membrane still blistered. The anolyte pH was lowered further to a range of 1–2. At this pH, some ammonium bisulfate may form and thus it was necessary to add extra ammonia to anolyte samples to ensure that only the sulfate form was present for analysis. No corrosion of the DSA-$O_2$ anode was observed. Also, much less ammonium nitrate was formed from the oxidation of ammonia than at higher pH values where an excess of ammonia was present (0.04% of the ammonium sulfate formed was ammonium nitrate vs. 4.0% in experiment #176-84). No nitrogen could be detected in anolyte off gases, indicating that ammonia was not being oxidized to nitrogen. Thus operation at a low anolyte pH seemed desirable and was tested further.

Two other cation exchange membranes were tested in the next three experiments (#200-6, 10, 14). Nafion™ 902 is another bilayer membrane similar to Nafion™ 901 but thinner. Damage to bilayer membranes by sulfate is known to be reduced as the membrane thickness decreases. Flemion™ FCA membrane is a monolayer perfluorinated carboxylic acid membrane which may not be damaged by sulfate. The experiments were performed at a current density of 200 mA/cm$^2$ and at the lower initial NaOH concentration of 40 g/l. The Nafion™ 902 membrane was undamaged after two experiments (#200-6 & 200-14). The current efficiencies for caustic formation are surprisingly low (92.6% and 86.2% for the two experiments) but large volume losses were seen in both experiments and thus current efficiencies may be suspect. Flemion™ FCA membrane (#200-10) was likewise undamaged after the run and gave a current efficiency for caustic formation similar to that seen for Nafion™ 902. At an anolyte pH of 1–2, no anode corrosion, no $N_2$ formation, and very little $NH_4NO_3$ formation was seen in these three experiments.

Comparative Example

Electrolytic Production of Sodium Hydroxide and Sulfuric Acid

Flow cell electrolyses of Glauber's salt purified as described in Example 2 were performed in an MP Cell™ (Electrocell, Sweden) using a three-compartment configuration shown in FIG. 1. A stainless steel cathode and an DSA-$O_2$ anode were used for all the experiments.

In a typical experiment the compartments were charged with the following solutions:

TABLE 3

STABILITY OF MEMBRANES AND DSA-02 ANODE FOR ELECTRODIALYSIS OF SODIUM SULFATE IN MP Cell ™

| | Experiment # | | | | | | |
|---|---|---|---|---|---|---|---|
| | 176-84(a) | 176-91(b) | 176-95(b) | 200-1(c) | 200-6(c) | 200-10(c) | 200-14(c) |
| Coul. Passed × 1000 | 322 | 360 | 625 | 382 | 275 | 297 | 362 |
| Electrodes, Anode/Cathode | DSA-02/Ni | DSA-02/Ni | DSA-02/Ni | DSA-02/Ni | DSA-02/Ni | DSA-02/Ni | DSA-02/Ni |
| Membranes, Anion/Cation | AMH/901 | AMH/901 | AMH/901 | AMH/901 | AMH/902 | AMH/Flemion ™ FCA | AMH/902 |
| Concentration, g/l | | | | | | | |
| Amm. Sulfate | 286.9 | 280.6 | 326.5 | 270.7 | 258.0 | 254.6 | |
| NaOH | 173.2 | 187.2 | 230.2 | 139.4 | 123.6 | 127.8 | 148.2 |
| % Current Efficiency | | | | | | | |
| Amm. Sulfate | 97.9 | 93.9 | 83.8 | 91.8 | 93.1 | 100 | |
| NaOH | 95.0 | 95.8 | 70.3 | 94.9 | 92.6 | 87.4 | 86.2 |
| Cell Voltage | 8.6 | 9.7 | 10.2 | 9.5 | 8.7 | 9.0 | 8.7 |
| Temperature, ° C. | 44 | 50 | 51 | 48 | 46 | 46 | 46 |
| Anolyte Wt. % Amm. Nitrate | 4.0 | 0.3 | 0.4 | 0.04 | 0.02 | 0.02 | |
| Feed Conc. NaOH, g/l | 0 | 2.0 | 30.8 | 5.1 | 0.9 | 4.8 | 4.0 |
| Δ Volume, ml 1000 C | | | | | | | |
| Anolyte | +0.59 | +0.85 | +0.82 | +0.99 | +0.67 | +1.35 | +0.60 |
| Catholyte | +0.91 | +0.94 | +0.35 | +0.30 | +0.60 | +0.55 | +0.45 |
| Feed | −1.64 | −1.86 | −1.34 | −1.44 | −2.35 | −2.21 | −2.39 |
| Δ Volume, overall ml | −45 | −26 | −108 | −58 | −116 | −92 | −166 |
| Anolyte pH | 9–10 | 6–8 | 7–10 | 1–2 | 1–2 | 1–2 | 1–2 |
| Anode Corrosion | Slight | Slight | Slight | None | None | None | None |
| Cation Exchange Membrane Stability | Blistered slightly | Blistered heavily | Blistered heavily | Blistered heavily | OK | OK | OK |

(a) Starting Conditions: Amm. Sulfate 132.14 g/l, NaOH 100 g/l, Sodium Sulfate 249 g/l, 200 mA/sq. cm.
(b) Starting Conditions: Amm. Sulfate 132.14 g/l, NaOH 100 g/l, Sodium Sulfate 249 g/l, 250 mA/sq. cm.
(c) Starting Conditions: Amm. Sulfate 132.14 g/l, NaOH 40 g/l, Sodium Sulfate 249 g/l, 200 mA/sq. cm.

| | |
|---|---|
| Catholyte | 1L, NaOH (0.11M) |
| Center compartment | 2L, Na$_2$SO$_4$ (2M) |
| Anolyte | 1L, H$_2$SO$_4$ (0.09M) |

The solutions were circulated through the cell at a flow rate of 0.4 gal/min. A constant current of 20 amps (200 mAcm$^{-2}$) was passed through the cell and the charge followed using a coulometer (Electrosynthesis Company) in the circuit. Samples (2 ml) were removed from the catholyte and the anolyte reservoirs at intervals and the concentration determined by titration against standardized acid and base. The temperature and cell voltages were recorded once they had reached a constant value, towards the end of the reaction. The volumes of the electrolytes were measured at the end of the reaction to allow the calculation of the number of moles of sodium hydroxide and sulfuric acid formed.

Membranes used include AM-1 and ACM membrane (Neosepta™, Tokuyama Soda), ARA membrane (Morgane, France) and Nafion™ 324 and 901 membranes (DuPont).

The current efficiency for the formation of both sodium hydroxide and sulfuric acid was determined over a range of operating conditions. The results are summarized in Table 4.

As can be seen from a comparison of runs 3 and 5, the current efficiency is affected only slightly by increasing the current density. However, increasing the current density does increase the cell voltage, approximately one volt for a 100 mAcM$^{-2}$ increase. The flow rate also seems to have only a minor effect on the current efficiency. If the flow rate is too low, however, it could lead to trapped gas bubbles on the electrode or the membrane, which will increase the cell voltage.

In experiments 1 to 5, when an AM-1 anion exchange membrane was used, there was a significant migration of protons into the center compartment. This lowers the current efficiency for the production of sulfuric acid (measured in the anolyte only). It also, eventually, leads to competition between protons

TABLE 4

Summary of Results

| | Experiment Number | | | | | | | | | |
|---|---|---|---|---|---|---|---|---|---|---|
| | 1[A] | 2[A] | 3[A] | 4[A] | 5[A] | 6[A] | 7[B] | 8[B] | 9[B,C] | 14[A] |
| Membranes | | | | | | | | | | |
| Cation | 324 | 324 | 324 | 324 | 324 | 324 | 324 | 324 | 901 | 324 |
| Anion | AM-1 | AM-1 | AM-1 | AM-1 | AM-1 | ACM | ACM | ARA | ACM | ACM |
| Current density/mA cm$^2$ | 100 | 200 | 200 | 200 | 350 | 200 | 300 | 250 | 250 | 200 |
| Flow Rate/gal min$^{-1}$ | 0.4 | 0.4 | 0.4 | 0.1 | 0.4 | 0.4 | 0.4 | 0.4 | 0.4 | 0.4 |
| Charge passed/Coulombs × 1000 | 289 | 302 | 580 | 288 | 617 | 388 | 605 | 642 | 600 | 381 |
| Wt Percentage | | | | | | | | | | |
| NaOH | 9.4 | 9.2 | 13.1 | 9.1 | 13.8 | 11.4 | 13.6 | 14.1 | 28[D] | 16 |
| N$_2$SO$_4$ | 9.4 | 9.4 | 13.1 | 9.7 | 15.7 | 16.2 | 19.9 | 18.3 | 18.1 | 16.6 |
| Wt Percentage H$_2$SO$_4$ in center compartment | 5.2 | 4.1 | 5.8 | 2.3 | 4.6 | 1.8 | 2.2 | 5.3 | 3.0 | 3.3 |
| Cell Voltage | 5.2 | 6.2 | 6.5 | 6.5 | 7.5 | 7.4 | 9.2 | 7.7 | 5.5 | 7.6 |
| Temperature/° C. | 35 | 42 | 43 | 45 | 54 | 42 | 47 | 43 | 45 | 48 |
| Current Efficiency after 250,000 Coulombs | | | | | | | | | | |
| NaOH | 93 | 90 | 89 | 92 | 84 | 90 | 99 | 94 | 90 | 95 |
| H$_2$SO$_4$ | 61 | 51 | 60 | 55 | 66 | 84 | 83 | 66 | 75 | 73 |
| 500,000 Coulombs | | | | | | | | | | |
| NaOH | — | — | 79 | — | 78 | — | 86 | 86 | 85 | — |
| H$_2$SO$_4$ | — | — | 50 | — | 56 | — | 72 | 61 | 65 | — |
| Final solution Volumes/ml | | | | | | | | | | |
| Catholyte | 1178 | 1238 | 1376 | 1211 | 1444 | 1295 | 1514 | 1526 | 961 | 1287 |
| Anolyte | 988 | 938 | 1100 | 969 | 1134 | 1100 | 1124 | 1116 | 1046 | 1074 |
| Center compartment | 1800 | 1700 | 1440 | 1750 | 1400 | 1590 | 1310 | 1390 | 1626 | 1512 |
| loss/gain ml | −36 | −124 | −84 | −70 | −22 | −15 | −52 | +32 | −117 | −127 |
| Proton balance moles H$^+$−moles OH$^−$ (moles formed) | +0.15 | −0.33 | +0.17 | −0.4 | −0.11 | +0.43 | −0.11 | +0.12 | −0.443 | −0.02 |

Notes:
[A]Reagent grade sodium sulfate 2M, 2 l;
[B]Purified Glauber salt, 2M, 2 L;
[C]NaOH starting concentration 5M, 750 ml;
[D]Starting WT percentages NaOH 19%

Two other anion exchange membranes were therefore investigated in an to attempt to minimize the proton migration. The membranes tested were ACM (Neosepta™) and ARA (Morgane). The ARA gave current efficiencies very similar to that observed for the AM-1 membrane, thereby showing no significant advantage over the previous results. The ACM membrane, however, gave a 20% increase in the current efficiency for the production of sulfuric acid and approximately halved the proton migration into the center compartment. The use of this membrane, however, leads to an increase of approximately one volt in the total cell voltage, compared to the AM-1 membrane.

When sodium ions are transported across the cation exchange membrane, water is also transported across the membrane, which leads to a diluting effect on the concentration of sodium hydroxide formed. This limits the concentration of sodium hydroxide which can be attained. The concentration of sodium hydroxide which can be achieved is also limited by the back migration of hydroxide ions, across the cation exchange membrane. The Nafion™ 324 cation exchange membrane limits the maximum concentration of sodium hydroxide which can be produced, to about 15–20%. The maximum concentration which may be produced can, in theory, be improved by using a Nafion™ 901 membrane. This membrane limits the back migration of hydroxide ions by using a bilayer structure in the membrane. This membrane is, however, more sensitive than the 324 membrane to the presence of heavy metal ion hydroxides. It is also sensitive to the pH of the center compartment. This phenomenon was discovered during some of the later experiments performed, by observation of the membrane itself. Too low a pH causes the membrane to blister and thereby damaging it beyond repair. According to manufacturer's data the membrane should not be run at pH less than 2 even on the anolyte side of the membrane.

Experiment 14 was run with the optimum cell configuration, i.e. a Nafion™ 324 cation exchange membrane and a Neosepta™ ACM anion exchange membrane. The current efficiency for NaOH and $H_2SO_4$ at 16% by weight concentration is 95% and 73% respectively. The water transport across these membranes has been estimated at three molecules of water accompanying every sodium ion transported across the Nafion™ membrane and two molecules of water with every sulfate ion transported across the ACM membrane.

Figure 3:
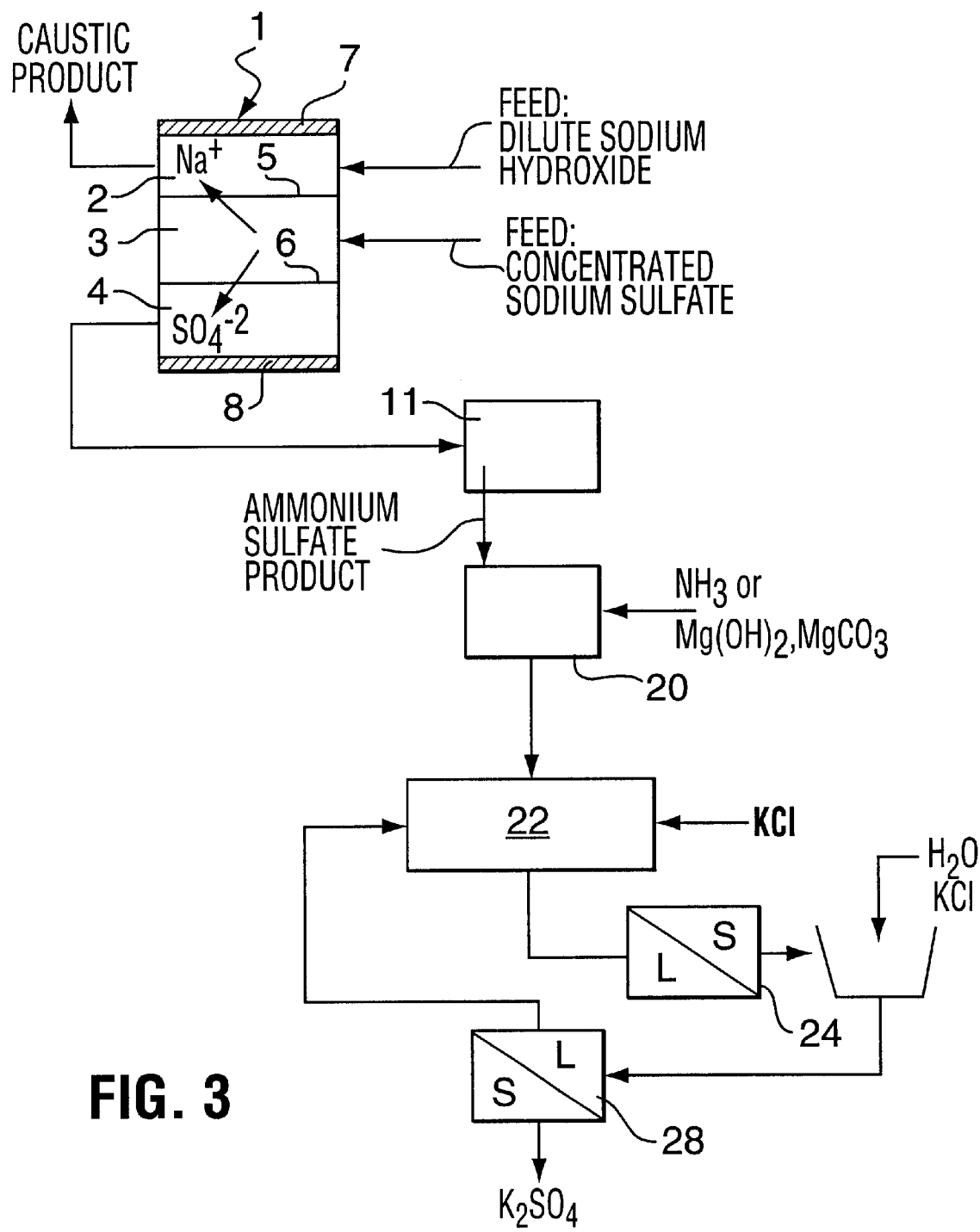
FIG. 3 is a schematic illustration of the process according to one embodiment of the present invention.

Referring now to FIG. 3, shown is a schematic illustration of the embodiment for forming potassium sulfate.

The ammonium sulfate product exiting storage reservoir 11 is subsequently transferred into a further storage reservoir 20 to which ammonia or magnesium hydroxide and/or magnesium carbonate are added. This material is useful to elevate the pH of the product which is then transferred into a further storage vessel 22 into which potassium chloride is added. It will be appreciated by those skilled in the art that magnesium compounds will be used if potassium sulfate is the desired product. In the event that potassium hydroxide is desired, ammonia will be used.

The mixture, referenced above, is transferred to a liquid solid separator 24 with the solid being rinsed with water and potassium chloride in vessel 26 and subsequently passed into a further liquid separator 28 the solid comprising potassium sulfate in a high grade form. The liquid filtrate is recycled back to vessel 22.

Figure 4:
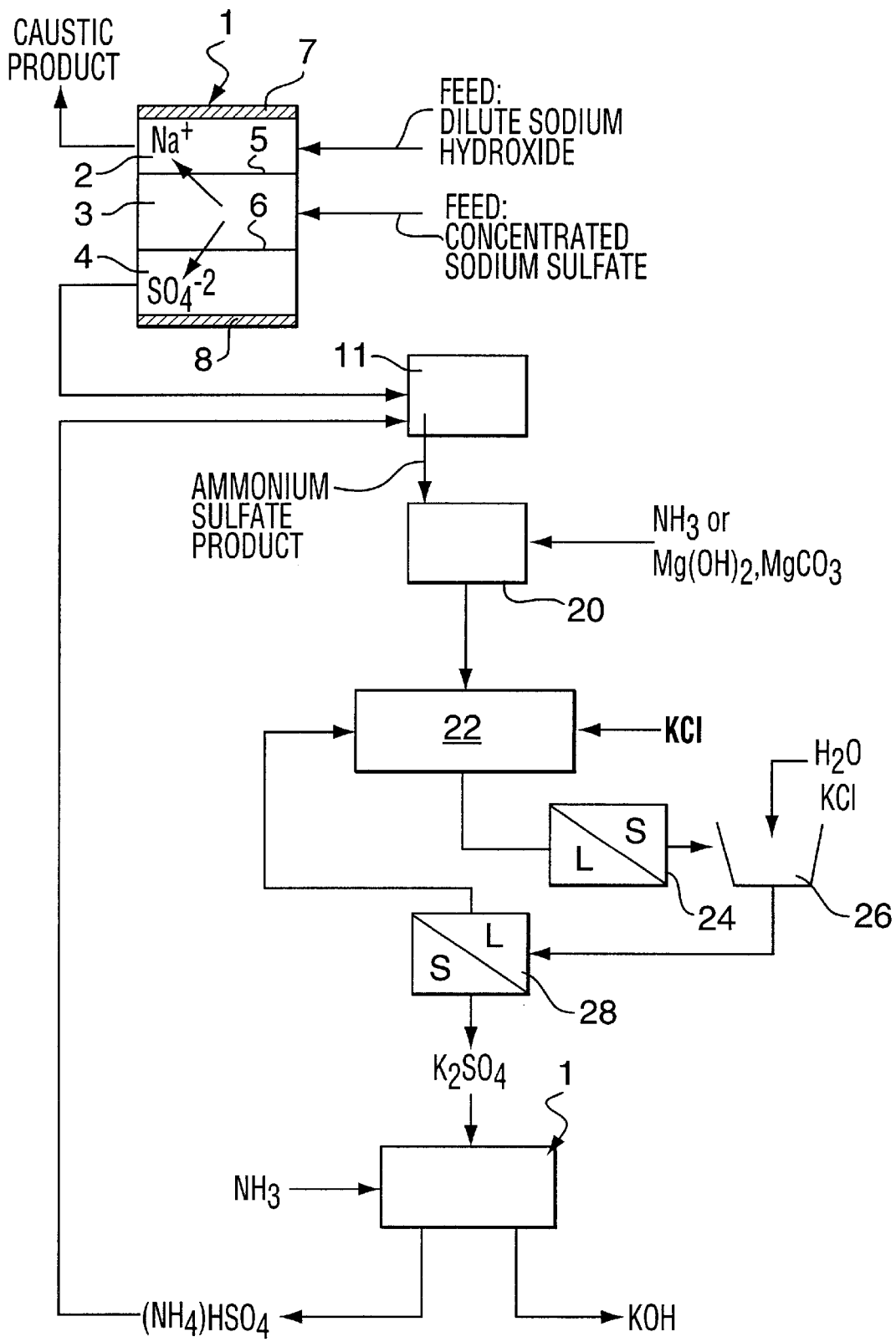
FIG. 4 is a schematic illustration of the process according to a further embodiment of the present invention.

In this manner, the initial material of sodium sulfate can be effectively converted to high grade potassium sulfate using the electrolytic cell. Turning now to FIG. 4, shown is a process flow diagram where the potassium sulfate appeared in FIG. 3, is further utilized by subjecting the material to the same electrolytic cell to generate potassium hydroxide with the added benefit of further ammonium sulfate which can be recycled into the cell.

In greater detail, FIG. 4 illustrates the concept where a further cell identical to that cell indicating with respect to FIGS. 1 through 3 is used and the feed comprises the potassium sulfate made in accordance with the process outline in FIG. 3. The potassium sulfate is fed into the cell as well as ammonia to generate potassium hydroxide and ammonium sulfate. The ammonium sulfate may be recycled to storage reservoir 11 for further generation of potassium sulfate and subsequently potassium hydroxide.

In FIGS. 1 and 2, the process effectively described a unit operation, however, it has been recognized that this unit operation can be effectively incorporated into a synthesis scheme where one may manufacture potassium sulfate, ammonium sulfate and potassium hydroxide.

In FIG. 4, it would be appreciated by those skilled in the art that the potassium to hydroxide formed in accordance with the process of FIG. 4, will typically have a concentration of between 15 to 22% by weight and that this can obviously be increased by simply evaporating the potassium hydroxide.

In order to formulate potassium carbonate or bicarbonate, the material used for neutralizing will vary as briefly discussed with respect to FIG. 3.

Figure 5:
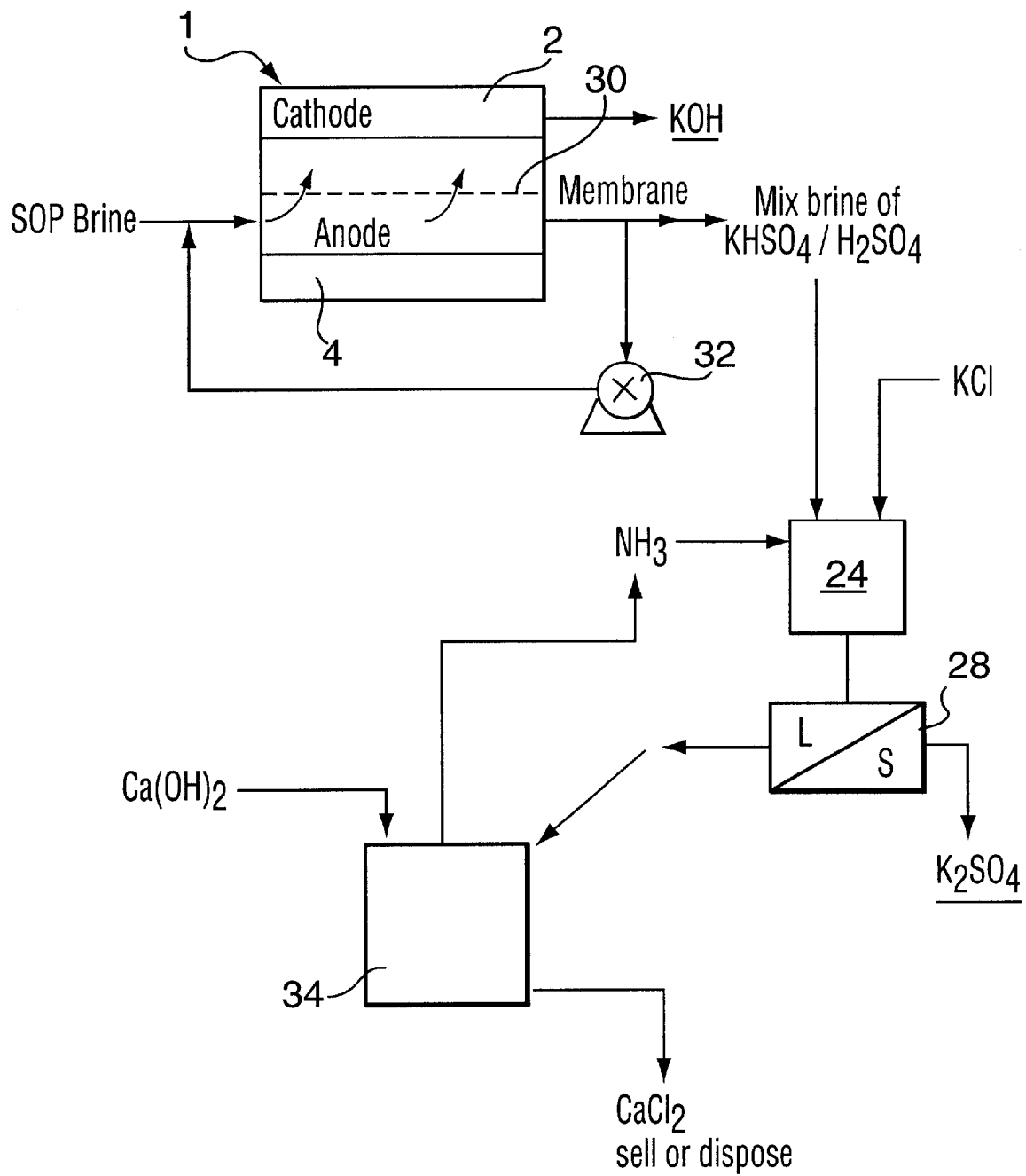
FIG. 5 is a schematic illustration of an alternate embodiment of the present invention.

Turning to FIG. 5, shown is a further alternate embodiment of the present invention in which a two-compartment cell is employed. In this embodiment, there is a cathode 2 and an anode 4 with a membrane 30. The overall process is useful to formulate potassium sulfate as a final product with one of the liquors being recycled as calcium chloride. In this variation, potassium sulfate brine is introduced into the cell 1 and undergoes the same process as set forth with respect to FIGS. 1 through 4. Potassium hydroxide exists cell 1 together with a mixed brine of potassium bisulfate and sulfuric acid. A pump 32 may be installed to recirculate the mixed brine through cell 1.

The mixed brine is introduced into a vessel 24 to which potassium chloride and ammonia are added. The mixture is then filtered into a liquid separator 28 with the solid product comprising potassium sulfate and the liquid comprising ammonium chloride. The ammonium chloride may be further processed in a vessel 34 to which calcium hydroxide has been added. As will be appreciated by those skilled in the art, calcium chloride will be a precipitate which can be sold or disposed of by suitable means.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A process for producing potassium sulfate in an electrolytic cell, comprising the steps of:

passing a solution of sodium sulfate through a central compartment of an electrolytic cell having a cathode compartment and an anode compartment separated from the central compartment by a cation selective ion exchange membrane and an anion selective ion exchange membrane, respectively;

passing a catholyte through the cathode compartment and an anolyte through the anode compartment;

passing a direct electric current between an anode and a cathode located in the anode compartment and the cathode compartment, respectively, thus producing sodium hydroxide in the cathode compartment and sulfuric acid in the anode compartment;

generating an acid ammonium sulfate;

elevating the pH of the ammonium sulfate to a substantially neutral pH;

introducing a potassium chloride; and precipitating potassium sulfate.

2. The process as set forth in claim 1, wherein said pH is elevated with ammonia.

3. The process as set forth in claim 2, wherein said pH is elevated with magnesium hydroxide.

4. The process as set forth in claim 2, wherein said pH is elevated with magnesium carbonate.

5. The process as set forth in claim 2, wherein said pH is elevated to a pH of about 6.0.

6. The process as set forth in claim 1, further including the step of filtering formed potassium sulfate and recycling filtrate to said step of introducing potassium chloride.

7. A process for producing potassium hydroxide and potassium sulfate, said process comprising the steps of:

(a) providing a first and a second three-compartment electrolytic cell, each cell having a cathode compartment and an anode compartment separated from a central compartment by a cation selective ion exchange membrane and anion selective ion exchange membrane;

(b) passing a solution of sodium sulfate through said central compartment;

(c) passing a catholyte through said cathode compartment and an anolyte through said anode compartment of said first three-compartment electrolytic cell;

(d) passing a direct current between an anode and a cathode located in said anode compartment and said cathode compartment, respectively, to produce sodium hydroxide in said cathode compartment and sulfuric acid in said anode compartment;

(e) generating ammonium sulfate;

(f) elevating the pH of said ammonium sulfate;

(g) introducing potassium chloride into said ammonium sulfate;

(h) forming potassium sulfate;

(i) feeding a solution of said potassium sulfate into said central compartment of a second three-compartment electrolytic cell;

(j) elevating the pH of said potassium sulfate; and (k) forming potassium hydroxide.

8. The process as set forth in claim 7, further including the step of forming ammonium sulfate.

9. The process as set forth in claim 8, further including the step of recycling formed ammonium sulfate to step (e).

10. The process as set forth in claim 7, further including the step of evaporating potassium hydroxide to concentrate said potassium hydroxide.

11. The process as set forth in claim 7, wherein the starting concentration of the sodium sulfate solution is from about 1M to about 3.5M.

12. The process as set forth in claim 11, wherein the starting concentration of the sodium sulfate solution is from about 2M to about 3M.

13. The process as set forth in claim 7, wherein the catholyte is an aqueous solution of sodium hydroxide having the starting concentration of from about 0.01M to about 9M.

14. The process as set forth in claim 7, wherein the starting concentration of sodium hydroxide solution is about 3M.

15. The process as set forth in claim 7, wherein the anolyte is an aqueous solution of ammonium sulfate having the starting concentration of from about 0.01M to about 3.5M.

16. The process as set forth in claim 7, wherein the cation selective ion exchange is made of an organic polymer having sulphonate or carboxylate groups attached thereto.

17. The process as set forth in claim 7, wherein the cation selective ion exchange membrane is a stable perfluorinated cation exchange membrane.

18. A process for producing potassium sulfate in an electrolytic cell, comprising the steps of:

passing a solution of potassium sulfate through an electrolytic cell having a cathode compartment and an anode compartment separated by an ion exchange membrane;

passing a direct current between said cathode and said anode to produce potassium hydroxide and a mixed brine of potassium bisulfate and sulfuric acid;

mixing said mixed brine of potassium bisulfate and sulfuric acid with potassium chloride to produce a mixture;

elevating the pH of the mixture;

introducing a potassium chloride into the mixture; and precipitating potassium sulfate.

* * * * *